US012767101B2

(12) United States Patent
Qin et al.

(10) Patent No.: US 12,767,101 B2
(45) Date of Patent: Oct. 20, 2026

(54) OPTIMIZATION METHOD AND OPTIMIZATION SYSTEM FOR VEHICLE BRAKING SYSTEM PARAMETERS

(71) Applicant: Robert Bosch GmbH, Stuttgart (DE)

(72) Inventors: Zhenlin Qin, Suzhou (CN); Hui Zhao, Suzhou (CN); Peng Qiu, Suzhou (CN); Zhongzhang Wen, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/001,182

(22) Filed: Dec. 24, 2024

(65) Prior Publication Data

US 2025/0214550 A1 Jul. 3, 2025

(30) Foreign Application Priority Data

Dec. 27, 2023 (CN) ......................... 202311823434.7

(51) Int. Cl.
*B60T 8/172* (2006.01)
*B60T 8/1761* (2006.01)

(52) U.S. Cl.
CPC ........... *B60T 8/172* (2013.01); *B60T 8/17616* (2013.01); *B60T 2270/30* (2013.01)

(58) Field of Classification Search
CPC ....... B60T 8/172; B60T 8/1761–17616; B60T 2270/30
See application file for complete search history.

(56) References Cited

FOREIGN PATENT DOCUMENTS

CN 117806927 A * 4/2024 ............. G06F 30/20

OTHER PUBLICATIONS

Ma, Xue-fei; CN 117806927, machine translation. (Year: 2024).*

* cited by examiner

*Primary Examiner* — Mark L. Greene
(74) *Attorney, Agent, or Firm* — Maginot, Moore & Beck LLP

(57) ABSTRACT

An optimization method and an optimization system for vehicle braking system parameters is disclosed. The method includes (i) performing a setting step that includes setting a goal for optimization of the vehicle braking system parameters and determining vehicle braking system parameters to be optimized, and setting working conditions according to the vehicle braking parameters to be optimized, (ii) performing a simulation step that includes establishing a simulation environment and simulating the set working conditions, (iii) performing a calculating step that includes, for each set of vehicle braking system parameters, extracting vehicle signals associated with braking performances from a simulation result, and calculating evaluation values of the braking performances of each set of vehicle braking system parameters based on the vehicle signals and the goal, (iv) performing a judging step that includes judging whether the evaluation values of the braking performances reach the goal; if no, adjusting the vehicle braking system parameters and repeatedly iterating the simulation step and the calculating step until the goal is reached; if yes, performing an output step that includes outputting the vehicle brake system parameters and the corresponding evaluation values. The simulation environment can be used to replace a real vehicle, and the simulation efficiency is improved.

12 Claims, 3 Drawing Sheets

OPTIMIZATION METHOD AND OPTIMIZATION SYSTEM FOR VEHICLE BRAKING SYSTEM PARAMETERS

This application claims priority under 35 U.S.C. § 119 to patent application no. CN 2023 1182 3434.7, filed on Dec. 27, 2023 in China, the disclosure of which is incorporated herein by reference in its entirety.

The present disclosure relates to vehicle control technology, and particularly relates to an optimization method and an optimization system for vehicle braking system parameters.

BACKGROUND

Functional parameters of an integrated power brake (IPB) or an electronic stability program (ESP) need to be tuned before software release. The tuning of these functional parameters in the prior art is executed by real vehicle and achieved by measurement recording and analysis.

However, such prior art has the following problems, for example:

- there are restrictions on vehicle resources and test sites;
- the tuning process relies on knowledge and experience of application engineers, there are no objective standards for certain working conditions, and the execution consistency of working conditions is low;
- due to time constraints, it is difficult to weigh parameter tuning in multiple performance dimensions.

SUMMARY

Based on the above-mentioned problems in the prior art, the present disclosure aims to provide an optimization method and an optimization system for vehicle braking system parameters, which are capable of replacing a real vehicle using a simulation environment.

Further, the present disclosure further aims to provide an optimization method and an optimization system for vehicle braking system parameters, which are capable of realizing parameter tuning using machine algorithms and are capable of obtaining parameter optimization balance in different performance dimensions.

In one aspect of the present disclosure, the optimization method for vehicle braking system parameters includes:

- a setting step, setting a goal for optimization of the vehicle braking system parameters and determining vehicle braking system parameters to be optimized, and setting working conditions according to the vehicle braking parameters to be optimized;
- a simulation step, establishing a simulation environment and simulating the set working conditions;
- a calculating step, for each set of vehicle braking system parameters, extracting vehicle signals associated with braking performances from a simulation result, and calculating evaluation values of the braking performances of each set of vehicle braking system parameters based on the vehicle signals and the goal;
- a judging step, judging whether the evaluation values of the braking performances reach the goal, if no, adjusting the vehicle braking system parameters and repeatedly iterating the simulation step and the calculating step until the goal is reached; if yes, performing an output step as follows; and
- the output step, outputting the vehicle braking system parameters and the corresponding evaluation values.

In one aspect of the present disclosure, there is provided with an optimization system for vehicle braking system parameters, wherein the optimization system includes:

- a setting module for setting a goal for optimization of the vehicle braking system parameters and determining vehicle braking system parameters to be optimized, and setting working conditions according to the vehicle braking parameters to be optimized;
- a simulation module used for establishing a simulation environment and simulating the working conditions;
- a calculating module used for, for each set of vehicle braking system parameters, extracting vehicle signals associated with braking performances from a simulation result, and calculating evaluation values of the braking performances of each set of vehicle braking system parameters based on the vehicle signals and the goal;
- a judgment module used for judging whether the evaluation values reach the goal; if no, adjusting the vehicle braking system parameters and repeatedly iterating the simulation module and the calculating module until the goal is reached; if yes, performing an output module as follows; and
- the output module used for outputting the vehicle braking system parameters and the corresponding evaluation values.

BRIEF DESCRIPTION OF THE DRAWINGS

The foregoing and other objectives and advantages of the present application will become more fully apparent from the following detailed description taken in conjunction with the accompanying drawings, in which identical or similar elements are denoted by the same reference numerals.

DETAILED DESCRIPTION

The following describes some of the examples of the present disclosure, aiming to provide a basic understanding of the present disclosure. It is not intended to identify key or decisive elements of the disclosure or to limit the scope of protection sought.

Figure 1:
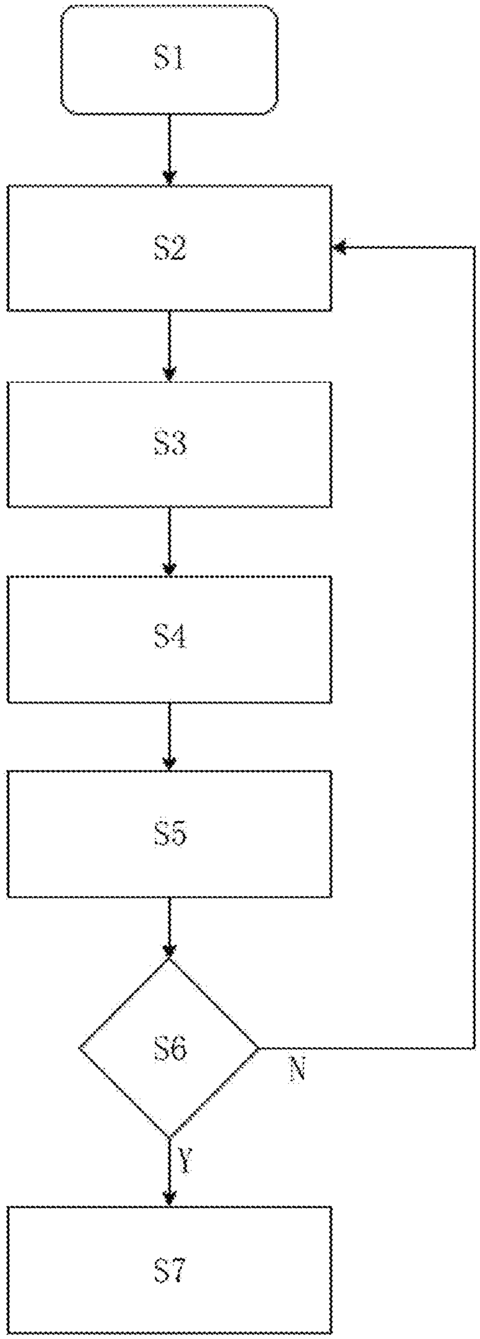
FIG. 1 is a flow diagram of an optimization method for vehicle braking system parameters according to an embodiment of the present disclosure.

FIG. 1 is a flow diagram of an optimization method for vehicle braking system parameters according to an embodiment of the present disclosure.

Figure 2:
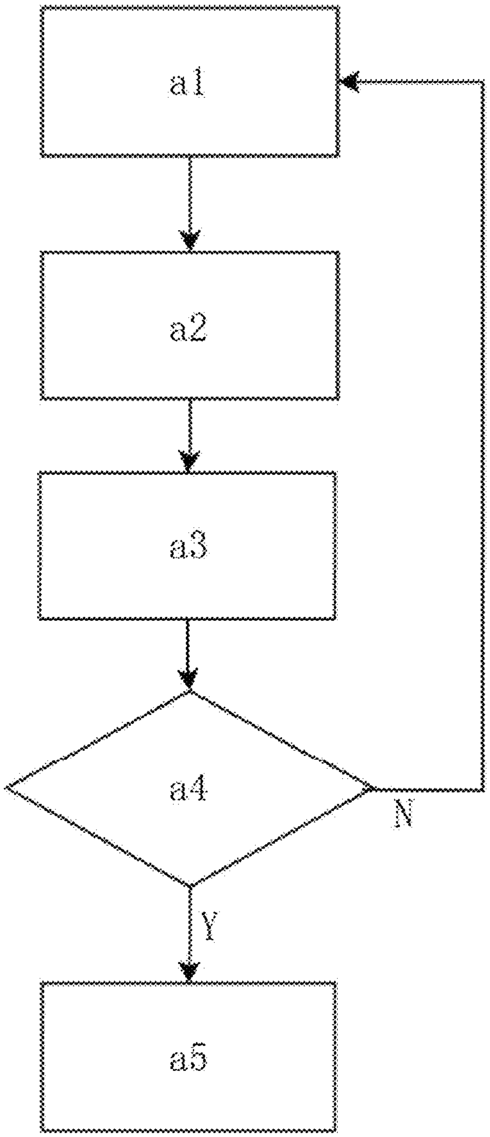
FIG. 2 is a flow diagram of one example of an optimization process.

As shown in FIG. 1, the optimization method for vehicle braking system parameters according to an embodiment of the present disclosure includes the following steps:

- Step S1: Starting;
- Step S2: setting a goal, defining working conditions and determining vehicle braking system parameters to be optimized (hereinafter referred to as "parameters"), wherein the goal refers to a goal to be achieved by optimization of the vehicle braking system parameters, for example, the deceleration is increased by adjusting the vehicle braking system parameters to control to achieve a short brake distance (e.g., less than 50 m), and in this case, the goal is a brake distance less than 50 m; and the working conditions refer to a simulation road of a vehicle simulation model, the vehicle braking system parameters are set according to different goals (e.g., ABS functions) required to be optimized, and simulation road files are written by simulation engineers for corresponding operating conditions;

Step S3: setting the simulation environment according to input information, the input information including, for example, software information (a software version should be consistent with a version used in a vehicle) and vehicle information (a mass, an axis distance, a wind resistance coefficient, etc.) for establishing the simulation environment;

Step S4: simulating the defined working conditions;

Step S5: evaluating the simulation result and making parameter adjustments, for example, scoring the simulation result based on the set goal using AI-based algorithms to obtain evaluation values, specifically including: for each set of parameters, extracting vehicle signals associated with braking performances from the simulation result generated by simulation (which is consistent with a sensor on an actual test vehicle), such as a deceleration, a wheel speed, an angular speed, etc., and calculating the corresponding evaluation values according to the set goal (e.g., a brake distance is calculated by the vehicle signals to be 40 m, and thus a difference with the goal of being less than 50 m is −10 m), wherein the relevant content will be described with reference to FIG. 2;

Step S6: judging whether the goal is reached, and if no (N), adjusting the parameters and returning to Step S2, otherwise (Y) proceeding to Step S7, wherein the so-called "judging whether the goal is reached" can include two aspects: in one aspect, whether the set maximum number of iterations is reached is judged, and in the other aspect, the evaluation values no longer increase after a certain number of iterations (for example, better parameters do not appear after 300 times of iterations after a set of parameters are updated), and it is believed that the iteration goal is met if any of the aspects is met; and Step S7: ranking all simulation results based on the evaluation values, wherein relevant content will be described with reference to FIG. 2.

The vehicle braking system parameters include but are not limited to the following parameters:

(1) ABS pressurization parameters: a front axle first wheel pressurization quantity, a rear axle first wheel pressurization quantity, a front axle first wheel pressurization gradient and an ABS trigger gate parameters;

(2) a front axle slip rate gate;

(3) a rear axle slip rate gate.

FIG. 2 is a flow diagram of one example of an optimization process.

As shown in FIG. 2, one example of the parameter optimization process of the present disclosure includes the following steps:

Step a1: obtaining a simulation result;

Step a2: extracting vehicle signals associated with braking performances from the simulation result;

Step a3: for each set of parameters, evaluating the vehicle signals in different braking performance dimensions to obtain evaluation values, the evaluation values being used for finding optimized parameters;

Step a4: judging whether an iterating goal has been reached, if no (N), adjusting the parameters and returning to step a1, otherwise (Y) continuing to perform step e; and Step a5: outputting an optimization result, as an example, showing a parameter rank with the evaluation values, for example, a ranking manner with the evaluation values from high to low may be adopted.

The vehicle signals associated with the performances are extracted, as an example, for example, in a scenario where the brake distance serves as the goal in the event of optimization of ABS function trigger, the vehicle signals associated with the braking performances include deceleration, wheel cylinder pressure, etc. As one example, different braking performance dimensions under this goal include, for example, a brake distance, brake comfort (which can be calculated by a fluctuation deviation of the deceleration, the smaller the deviation, the higher the comfort) and the like.

The vehicle signals are evaluated in different braking performance dimensions for each set of parameters and the evaluation values are obtained, which may be achieved by an AI algorithm model. As one example, the vehicle braking system parameters, the vehicle signals associated with the braking performances, and the set goal are input into the AI algorithm model, the evaluation values are calculated using the AI algorithm models based on the vehicle signals associated with the braking performances and the set goal, and each set of parameters and their evaluation values are output.

As one example, the AI algorithm model can be achieved by adopting the Bayesian model, and using the Bayesian model is capable of improving the parameter optimization efficiency, because in essence, optimal parameters can be found by violently traversing all parameter combinations in order to reduce the search space for optimizing parameters during optimization, but traversing methods actually require a lot of time cost, while adopting the Bayesian model is capable of saving time and increasing efficiency.

In another aspect, in the presence of multiple braking performance dimensions, it is also possible to calculate the comprehensive evaluation value for each set of parameters according to the user's preferences using weights for different braking performance dimensions. Here, the user's preferences can be achieved by the user defining the weights for them, ultimately obtaining the comprehensive evaluation value by weighting based on the weights.

An example of setting weights for different braking performance dimensions and calculating the comprehensive evaluation value is listed below.

For each set of parameters, one corresponding simulation result is obtained, and the vehicle signals associated with the braking performances are extracted from the simulation result to calculate the evaluation values (recorded here as "score") of the braking performances (i.e., the brake distance, the brake comfort, etc. described above). It is supposed that there are a parameter set 1, a parameter set 2, a parameter set 3 . . . , and supposed that evaluation is performed from performance 1 and performance 2:

an evaluation value of performance 1 is score1, and an evaluation value of performance 2 is score2 if user 1 uses weights a1, a2, a formula for calculating the comprehensive evaluation value is as follows:

score_a=a1*score1+a2*score2 the score for each set of parameters is:

parameter set 1: score_a1 parameter set 2: score_a2 parameter set 3: core_a3

. . .

if user 2 uses weights b1, b2, a formula for calculating the comprehensive evaluation value is as follows:

score_b=b1*score1+b2*score2 the score for each set of parameters is:

parameter set 1: core_b1
parameter set 2: core_b2
parameter set 3: score_b3
. . .

By adopting such weights set according to user's preferences, it is possible to consider performance indicators while also taking account of the user's preferences.

The optimization method for vehicle braking system parameters of the present disclosure has been described above, followed by the description of an optimization system for vehicle braking system parameters of the present embodiment.

Figure 3:
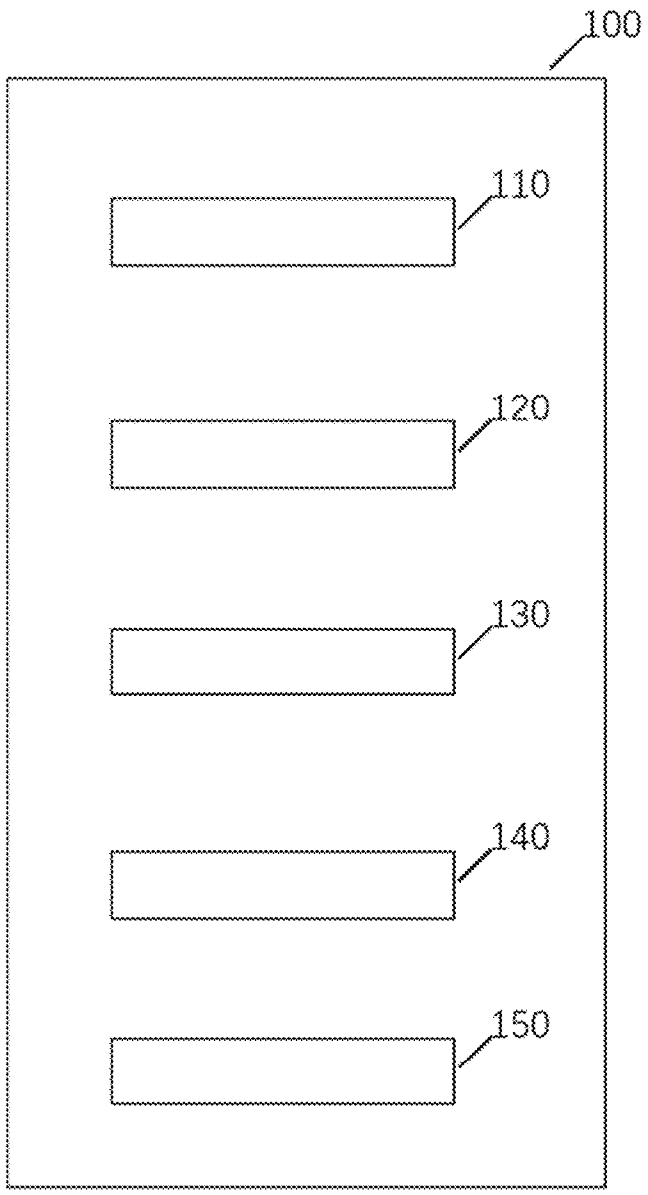
FIG. 3 is a structural block diagram of an optimization system for vehicle braking system parameters according to an embodiment of the present disclosure.

FIG. 3 is a structural block diagram of an optimization system for vehicle braking system parameters according to an embodiment of the present disclosure.

As shown in FIG. 3, the optimization system 100 for vehicle braking system parameters according to an embodiment of the present disclosure includes:

a setting module 110 used for setting a goal for optimization of the vehicle braking system parameters and determining vehicle braking system parameters to be optimized, and setting working conditions according to the vehicle braking parameters to be optimized;

a simulation module 120 used for establishing a simulation environment and simulating the working conditions;

a calculating module 130 used for, for each set of vehicle braking system parameters, extracting vehicle signals associated with braking performances from a simulation result, and calculating evaluation values of the braking performances of each set of vehicle braking system parameters based on the vehicle signals and the goal;

a judgment module 140 used for judging whether the evaluation values reach the goal; if no, adjusting the vehicle braking system parameters and repeatedly iterating the simulation module and the calculating module until the goal is reached; if yes, performing an output module as follows; and the output module 150 used for outputting the vehicle braking system parameters and the corresponding evaluation values. In the calculating module 130, the evaluation values of the braking performances of each set of vehicle braking system parameters are calculated using the Bayesian model based on the vehicle signals and the goal. Moreover, in the calculating module 130, the evaluation values of a plurality of braking performances are calculated according to user's preferences in different braking performance dimensions, respectively, and a comprehensive evaluation value of different braking performance dimensions is calculated according to weights for the different braking performance dimensions.

In the output module 150, a rank of the vehicle braking system parameters with the evaluation values is shown, e.g., a ranking manner with the evaluation values from high to low may be adopted for showing.

As noted above, the optimization method and the optimization system for vehicle braking system parameters of the present disclosure are capable of being applied to tuning of functional parameters of the integrated power brake (IPB) and the electronic stability program (ESP).

Moreover, the optimization method and system for vehicle braking system parameters according to the present disclosure are capable of replacing the real vehicle with the simulation environment in predefined scenarios, thereby being capable of saving vehicle resources and test site resources, and effectively reducing costs.

Further, AI optimization algorithms are used in the calculating step, and automated measurement evaluation and parameter tuning are performed according to objective criteria extracted from empirically-confirmed measurements and the experience of engineers, the process of parameter tuning is capable of being standardized.

Moreover, user's preferences will be considered by adopting the fine-tuning parameters of the Bayesian algorithm, resulting in optimized balance in different performance dimensions.

The above is merely a specific embodiment of the present application, and the scope of protection of the present application is not limited thereto. Those skilled in the art may conceive other feasible variations or substitutions based on the technical scope disclosed in the present application, and such variations or substitutions are all encompassed within the scope of protection of the present application. Where there is no conflict, the embodiments of the present application and the features within the embodiments can also be combined with each other. The scope of protection of the present application is subject to the scope of protection of the Claims.

What is claimed is:

1. An optimization method for vehicle braking system parameters of a braking system of a vehicle, comprising:

performing a setting step that includes setting a goal for optimization of the vehicle braking system parameters and determining the vehicle braking system parameters to be optimized, and setting working conditions according to the vehicle braking system parameters to be optimized;

performing a simulation step that includes establishing a simulation environment and simulating the set working conditions;

performing a calculating step that includes, for each of a plurality of sets of the vehicle braking system parameters, extracting vehicle signals associated with braking performances from a simulation result, and calculating evaluation values of the braking performances of each set of vehicle braking system parameters based on the vehicle signals and the goal;

performing a judging step that includes judging whether the evaluation values of the braking performances reach the goal, wherein:

if no, adjusting the vehicle braking system parameters and repeatedly iterating the simulation step and the calculating step until the goal is reached; and if yes, performing an output step that includes outputting the vehicle braking system parameters and the evaluation values; and controlling the braking system of the vehicle based on the outputted vehicle braking system parameters.

2. The optimization method for vehicle braking system parameters according to claim 1, wherein:

in the calculating step, the evaluation values of the braking performances of each set of vehicle braking system parameters are calculated using a Bayesian model based on the vehicle signals and the goal.

3. The optimization method for vehicle braking system parameters according to claim 2, wherein:

in the calculating step, for each set of vehicle braking system parameters, the vehicle signals associated with the braking performances and the goal are input into the Bayesian model, and the evaluation values of the braking performances of each set of vehicle braking system parameters are calculated using the Bayesian model based on the vehicle signals associated with the braking performances and the goal.

4. The optimization method for vehicle braking system parameters according to claim 3, wherein:

in the calculating step, calculating the evaluation values of the braking performances of each set of vehicle braking system parameters comprises:

calculating the evaluation values of a plurality of braking performances according to user's preferences in different braking performance dimensions, respectively, and calculating a comprehensive evaluation value of the different braking performance dimensions according to weights of the different braking performance dimensions.

5. The optimization method for vehicle braking system parameters according to claim 4, wherein:

in the calculating step, calculating the evaluation values of the plurality of braking performances in the different braking performance dimensions, respectively, and calculating the comprehensive evaluation value of the different braking performance dimensions according to the weights of the different braking performance dimensions comprise:

setting N braking performance dimensions, wherein N is a natural number;

calculating the evaluation values of N braking performances for the N braking performance dimensions, respectively; and setting weights for the evaluation values of the N braking performances, respectively, and summing the evaluation values of the N braking performances based on the weights to obtain the comprehensive evaluation value.

6. The optimization method for vehicle braking system parameters according to claim 5, wherein:

judging whether the evaluation values reach the goal in the judging step comprises any of:

determining whether a number of iterations reaches a preset maximum number of iterations; and judging that the evaluation values no longer increase after a specified number of iterations.

7. The optimization method for vehicle braking system parameters according to claim 1, wherein the vehicle braking system parameters comprise one or more of:

ABS pressurization parameters;

a front axle slip rate gate; and a rear axle slip rate gate.

8. A non-transitory computer-readable medium having a computer program stored thereon, wherein the computer program, when executed by a processor, implements the optimization method for vehicle braking system parameters according to claim 1.

9. A computer device, comprising a non-transitory storage medium, a processor, and a computer program stored on the non-transitory storage medium and capable of running on the processor, wherein:

the processor, when executing the computer program, implements the optimization method for vehicle braking system parameters according to claim 1.

10. An optimization system for vehicle braking system parameters of a braking system of a vehicle, comprising:

a processor configured to:

perform a setting step that includes setting a goal for optimization of the vehicle braking system parameters and determining the vehicle braking system parameters to be optimized, and setting working conditions according to the vehicle braking system parameters to be optimized;

perform a simulation step that includes establishing a simulation environment and simulating the working conditions;

perform a calculating step that includes, for each of a plurality of sets of the vehicle braking system parameters, extracting vehicle signals associated with braking performances from a simulation result, and calculating evaluation values of the braking performances of each set of vehicle braking system parameters based on the vehicle signals and the goal;

perform a judgment step that includes judging whether the evaluation values reach the goal, wherein:

if no, adjusting the vehicle braking system parameters and repeatedly iterating the simulation step and the calculating step until the goal is reached; and if yes, performing an output step that includes outputting the vehicle braking system parameters and the evaluation values; and control the braking system of the vehicle based on the outputted vehicle braking system parameters.

11. The optimization system for vehicle braking system parameters according to claim 10, wherein:

in the calculating step, the evaluation values of the braking performances of each set of vehicle braking system parameters are calculated using a Bayesian model based on the vehicle signals and the goal.

12. The optimization system for vehicle braking system parameters according to claim 10, wherein:

in the calculating step, the evaluation values of a plurality of braking performances are calculated according to user's preferences in different braking performance dimensions, respectively, and a comprehensive evaluation value of the different braking performance dimensions is calculated according to weights of the different braking performance dimensions.

* * * * *